United States Patent Office 3,056,424
Patented Oct. 2, 1962

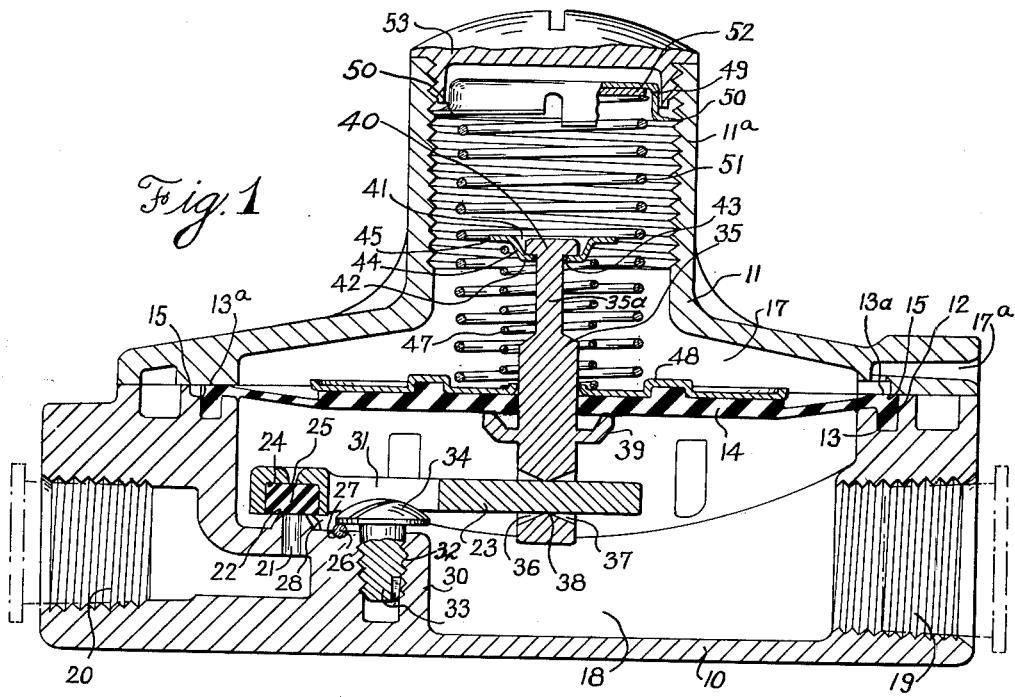
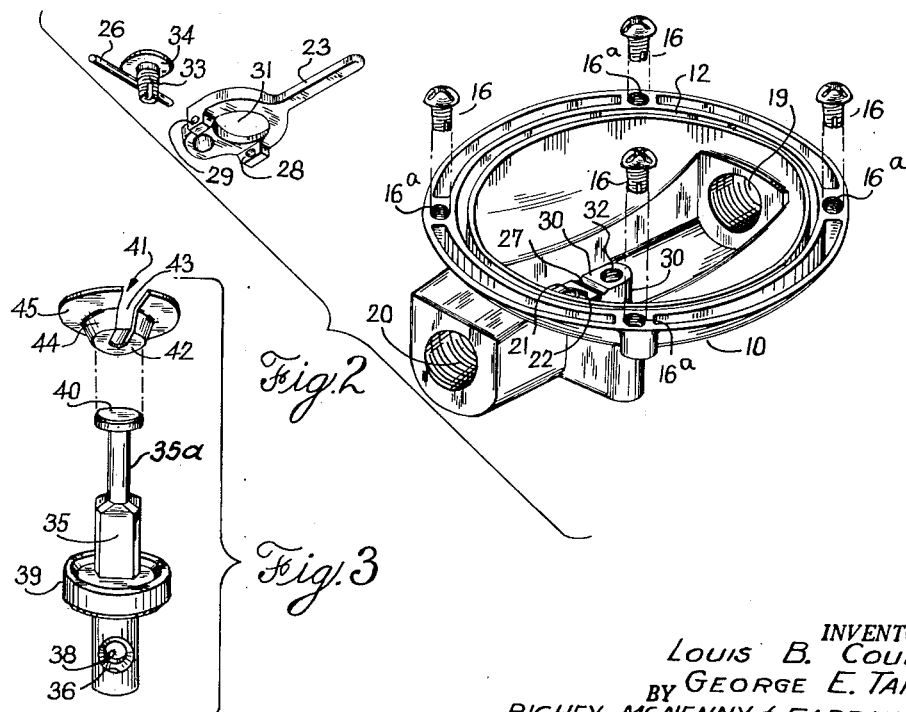

3,056,424
FLUID PRESSURE REGULATOR VALVE
Louis B. Courtot, Euclid, and George E. Tanker, South Euclid, Ohio, assignors to The Weatherhead Company, Cleveland, Ohio, a corporation of Ohio
Filed Oct. 26, 1960, Ser. No. 65,177
2 Claims. (Cl. 137—505.46)

This invention relates to a fluid pressure regulator.

A wide variety of fluid pressure regulators have been proposed heretofore which operate in accordance with the pressure of the fluid acting against a flexible diaphragm. In such regulators the diaphragm is coupled to a valve so as to control the opening and closing of the valve and thereby regulate the flow of the fluid through the regulator. One of the significant disadvantages of prior regulators of this general type has been the relative complexity of their construction, particularly the valve mechanism controlled by the diaphragm, which added to their cost and difficulty of manufacture.

The present invention is directed to an improved fluid pressure regulator having a novel and simplified construction that enables the regulator to be manufactured more economically and with greater ease.

It is an object of this invention to provide a novel and improved fluid pressure regulator.

It is also an object of this invention to provide such a pressure regulator having a novel construction enabling it to be assembled more easily, more quickly and at lower cost.

It is also an object to provide such a pressure regulator which is particularly suitable for use where the fluid consumption takes place at relatively low rates, such as in bottled gas systems for trailer homes and the like.

Further objects and advantages of this invention will be apparent from the following detailed description of a presently-preferred embodiment thereof, which is illustrated in the accompanying drawing.

In the drawings:

FIG. 1 is a vertical sectional view of the present regulator;

FIG. 2 is an exploded perspective view of the lower portion of the regulator shown in FIG. 1; and FIG. 3 is a fragmentary exploded perspective view showing the stem which is associated with the diaphragm of the regulator and the spring-retaining collar associated therewith.

Referring to the drawing, the pressure regulator comprises a housing having a base or body portion 10 and a cover 11. At its top edge the body 10 is formed with an upwardly facing circular groove 12 in which is seated the marginal flange 13 of a flexible, resilient diaphragm 14 of rubber-like material. As best seen in FIG. 1 the top face 13a of the marginal flange 13 on the diaphragm is engaged uninterruptedly around its entire circumferential extent by a continuous, flat, annular bottom surface 15 on the cover member 11. The cover 11 and the body 10 are secured to each other by a plurality of self-tapping screws 16 (FIGURE 2). These screws extend down through openings in the cover and threadedly engage in registering openings 16a in the body 10. With this arrangement, the margin of the diaphragm is clamped between the cover 11 and the body 10, separating a chamber 17 in the cover 11 from a fluid pressure chamber 18 in the body 10 below the diaphragm. The chamber 17 in the cover communicates with the atmosphere through a vent 17a.

The body member is formed with a threaded outlet passage 19 leading from the pressure chamber 18. A threaded inlet passage 20 in the body member 10 communicates with the pressure chamber 18 through a restricted vertical passage 21. At the upper end of this passage the body member 10 presents an upwardly-facing annular valve seat 22.

A lever 23 disposed within the pressure chamber 18 has, at one end, a downwardly facing circular recess 24 in which is snugly seated a valve member 25 of rubber-like material. This valve member engages the upwardly-facing valve seat 22 and shuts off fluid communication between the pressure chamber 18 and the inlet passage 20 in the horizontal position of the lever 23, as shown in FIG. 1.

In accordance with the present invention, the valve lever 23 is pivotally supported by means of a cross pin 26 which is seated in an upwardly-facing groove 27 formed on a boss 30 which is integral with the body 10 of the regulator. The opposite ends of the cross pin 26 are received in holes drilled in depending ears 28 and 29 on the lever 23 (FIG. 2). These depending ears are disposed on opposite sides of the boss 30 on the regulator body 10.

Between its depending ears 28 and 29 the lever 23 is formed with a circular opening 31 at the opposite side of the pivot pin 26 from the valve 25. The boss 30 on the regulator body 10 is formed with an upwardly facing, vertical, opening 32 directly below the opening 31 in the lever. A self-tapping screw 33 is threadedly engaged in this opening. This screw has a head 34 on its upper end which overlies the lever pivot pin 26 and retains the latter in place seated in the groove 27. The screw head 34 is accessible from above through the opening 31 in lever 23.

The end of lever 23 remote from valve member 25 is pivotally coupled to a vertical stem 35 which, in turn, is coupled to the diaphragm 14. As best seen in FIG. 1, the lower end of the stem 35 is formed with a generally horizontal opening for receiving the lever 23. This opening is made up of oppositely directed, outwardly flared recesses 36 and 37 joined by a restricted bore 38 which provides a bearing support for the lever 23. With this arrangement, when the stem 35 moves down it causes the valve lever 23 to pivot about the pin 26 in a clockwise direction in FIG. 1 to unseat the valve member 25 from the valve seat 22 and thereby effect fluid communication between the pressure chamber 18 and the inlet passage 20.

The stem 35 is formed with an integral, generally dish-shaped flange 39 which engages the lower face of the diaphragm 14. At its upper end the stem is formed with an integral enlarged head 40. A generally dish-shaped spring retainer collar 41 engages the underside of this head. This collar is formed with a flat bottom wall 42, an upwardly and outwardly inclined annular side wall 44 and a laterally protruding annular top flange 45. A slot 43 (FIG. 3) extends from one side through the top flange 45 and the side wall 44 and into the bottom wall 42 of the retainer collar. This slot provides convenient assembly of the spring retainer plate and the stem 35. Slot 43 is dimensioned to pass the reduced shank portion 35a of the stem just below the head 40. When assembled, the head 40 on the stem seats on the top face of the bottom wall 42 of the collar.

A relief spring 47 is engaged under compression between the underside of the top flange 45 on the spring retainer collar 41 and a plate 48 on the top of diaphragm 14.

The cover member 11 has an upwardly extending, centrally disposed tubular portion 11a which is screw threaded internally. Threadedly mounted in this portion of the cover is an adjusting screw in the form of a dished sheet metal member 49 having a spirally curved, split peripheral flange 50 at its lower end which engages in the thread grooves of the cover portion 11a. A coil spring 51 is engaged under compression between the plate 48 on the top of diaphragm 14 and a washer 52 engaged beneath the adjusting screw 49. The adjusting screw is provided with a suitable slot in its top so as to enable it to be turned to adjust the force which the spring 51 exerts against the diaphragm 14.

A screw threaded cap 53 closes the upper end of the threaded portion 11a of the cover.

Preferably, the groove 27 and the openings 21 and 32 in the regulator body 10 are formed, during the casting of the body 10, by corresponding parts of the die-casting mold. This eliminates the necessity of subsequent machining operations to form these portions of the regulator body. The dimensional tolerances are established in the mold and great uniformity in the end product is obtained.

In the operation of this mechanism, the spring 51 exerts a downward bias on diaphragm 14 which is transmitted to stem 35, tending to pivot the valve lever 23 clockwise in FIG. 1 and thereby unseat the valve member 25 from valve seat 22. Therefore, when the pressure in the pressure chamber 18 is below a predetermined value, the valve will be opened. Whenever the pressure in chamber 18 exceeds this predetermined value, as determined by the bias on spring 51, the diaphragm 14 will move upward to the position shown in FIG. 1, causing the lever 23 to position the valve member 25 seated against the valve seat 22.

From the foregoing description it will be apparent that the complete pressure regulator, and particularly the valve lever 23 and its pivotal support 26, may be assembled quite readily. Only a single mounting screw 33 is required to complete the pivotal mounting of the valve lever 23 on the body 10 of the pressure regulator. Since the head of this screw is accessible through the opening 31 in the valve lever, it is a simple matter to first position the valve lever with its pivot pin 26 seated in the groove 27 on the pressure regulator body and then insert the single mounting screw 33 down through the opening 31 in the valve lever and into the opening 32 in the boss 30 on the pressure regulator body. This, of course, is done before the diaphragm 14 is assembled onto the pressure regulator body.

From the foregoing description it will be apparent that the illustrated embodiment is particularly well suited for accomplishing the stated objects and advantages of this invention. However, while a presently-preferred embodiment has been shown and described, it is to be understood that various modifications, omissions and refinements which depart from the disclosed embodiment may be adopted without departing from the spirit and scope of this invention.

What is claimed is:

1. A fluid pressure regulator comprising a housing including a cast body defining an outwardly facing pressure chamber and a cover member, said body and cover member being joined together along a rim extending circumferentially around said pressure chamber, a flexible diaphragm disposed between said body and said cover member, said diaphragm defining the outer wall of said pressure chamber, said body having an integral inner wall for said pressure chamber spaced from said diaphragm by a peripheral side wall portion of said body, an outlet for said pressure chamber formed in said body, said body having an inlet chamber intermediate said rim and said inner wall, partition means integral with said body separating said inlet chamber and said pressure chamber, said partition means including a boss extending outward from said inner wall toward said diaphragm and spaced inwardly from said peripheral side wall portion, said partition means including an outer wall portion extending between said boss and said peripheral side wall portion, said outer wall portion being exposed to said pressure chamber on the outer side and to said inlet chamber on its inner side, an integrally cast outwardly facing valve seat on the outer side of said outer wall portion, a passage extending through said outer wall portion centrally of said valve seat and interconnecting said inlet chamber and said pressure chamber, a cast outwardly facing groove extending transversely across the outer side of said boss on the side of said valve seat away from said peripheral side wall portion, a pivot pin disposed in said outwardly facing groove, clamping means to secure said pivot pin in said groove, a lever disposed substantially parallel to said diaphragm and pivotally journaled intermediate its ends on said pivot pin, said lever being disposed radially of said body and having one end extending adjacent said valve seat, closure means on said one end of said lever cooperable with said valve seat when said lever is rotated in one direction about said pivot pin to close off said passage, the other end of said lever extending toward the central portion of said pressure chamber, means interconnecting said diaphragm and said other end of said lever whereby inward movement of said diaphragm and said interconnecting means rotates said lever in the other direction to shift said closure means away from said valve seat, and means to bias said diaphragm in the inward direction.

2. A fluid pressure regulator as set forth in claim 1 wherein said lever has an aperture adjacent said pivot pin and said clamping means comprises a screw threadedly engaged in said boss in substantial axial alignment with said aperture.

References Cited in the file of this patent

UNITED STATES PATENTS

| 2,543,203 | Roney | Feb. 27, 1951 |
| 2,582,974 | Ey | Jan. 22, 1952 |
| 2,592,259 | Eddy | Apr. 8, 1952 |

FOREIGN PATENTS

| 483,243 | Italy | July 22, 1953 |